United States Patent
Umetsu et al.

(10) Patent No.: US 6,810,915 B2
(45) Date of Patent: Nov. 2, 2004

(54) ACCUMULATOR HAVING A SAFETY VALVE

(75) Inventors: Chiharu Umetsu, Kanagawa (JP);
Hiroshi Mizukami, Kanagawa (JP);
Koichiro Yamada, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 10/308,717

(22) Filed: Dec. 3, 2002

(65) Prior Publication Data
US 2003/0116209 A1 Jun. 26, 2003

(30) Foreign Application Priority Data

Dec. 4, 2001 (JP) ........................................ 2001-370123

(51) Int. Cl.⁷ ............................................... F16L 55/04
(52) U.S. Cl. ............................. 138/31; 138/30; 138/26; 137/797; 137/68.11; 220/721
(58) Field of Search ............................. 138/31, 30, 26; 303/87; 220/721; 137/68.11, 68.19, 68.23, 797

(56) References Cited

U.S. PATENT DOCUMENTS

| | | | | |
|---|---|---|---|---|
| 2,271,786 A | * | 2/1942 | Watkins | 137/73 |
| 2,365,994 A | * | 12/1944 | Ashton | 138/31 |
| 2,688,984 A | * | 9/1954 | Snyder | 138/31 |
| 3,245,578 A | * | 4/1966 | Sutton | 220/89.4 |
| 3,714,964 A | * | 2/1973 | Livingston | 137/513.3 |
| 3,730,204 A | * | 5/1973 | Bissett | 137/68.14 |
| 4,059,125 A | * | 11/1977 | Sugimura et al. | 137/73 |
| 4,452,275 A | * | 6/1984 | Sugimura | 138/30 |
| 4,733,872 A | | 3/1988 | Sugimura | |
| 4,997,009 A | * | 3/1991 | Niikura et al. | 138/30 |
| 6,189,572 B1 | * | 2/2001 | Ruffer et al. | 138/30 |
| 6,286,552 B1 | * | 9/2001 | Shimbori et al. | 138/31 |
| 6,494,545 B2 | * | 12/2002 | Nakamura et al. | 303/87 |

FOREIGN PATENT DOCUMENTS

| | | |
|---|---|---|
| JP | 6-6241 | 12/1993 |
| JP | 03 134303 A | 6/1997 |
| JP | 11 315802 A | 11/1999 |

* cited by examiner

Primary Examiner—Patrick Brinson
(74) Attorney, Agent, or Firm—Marshall & Melhorn, LLC

(57) ABSTRACT

In an accumulator comprising a pressure vessel, a bellows dividing the interior of the pressure vessel into a gas chamber filled with pressurized gas and a liquid chamber which communicates with a liquid pressure circuit via a liquid introduction port, a stay member attached to the inner surface of the pressure vessel inside the bellows and provided with a communication port for communicating the interior and exterior of the stay member with each other and adapted to be closed by a part of the bellows to define a fully contracted state of the bellows, and a safety valve provided in the stay member, typically in the form of a weakened portion of the stay member, for selectively communicating the exterior of the stay member with the interior of the stay member. Thus, because the safety valve is not provided in the pressure vessel itself, the safety valve of the present invention would not affect the sealing capability of the pressure vessel.

13 Claims, 3 Drawing Sheets

ACCUMULATOR HAVING A SAFETY VALVE

TECHNICAL FIELD

The present invention relates to an accumulator for absorbing pressure pulsation and accumulating pressure in various forms of vehicle onboard equipment, such as hydraulic brakes for vehicles, and industrial hydraulic machinery.

BACKGROUND OF THE INVENTION

Accumulators having a pressure vessel divided into two chambers by a bellows to fill one of the chambers with high pressure gas are known. When such an accumulator is exposed to a high temperature for a prolonged period of time as is the case in a fire, the inner pressure rises sharply with the rise in temperature, and the heat may damage the pressure withstanding strength to such an extent that the pressure vessel could rupture.

To avoid such a problem, it is proposed in Japanese UM publication (kokoku) 06-6241 to provide an exhaust opening in the pressure vessel to communicate the gas chamber with the atmosphere and insert a fuse packing that melts at a prescribed temperature in this exhaust opening.

According to such a safety measure, the sealing of the pressure vessel in normal use must rely on the sealing capability of the fuse packing which however is unable to provide an adequate sealing capability. Therefore, according to such an arrangement, it would be difficult, if not impossible, to prevent leakage of gas from the exhaust opening and ensure a required pressure level over an extended period of time.

BRIEF SUMMARY OF THE INVENTION

In view of such problems of the prior art, a primary object of the present invention is to provide an accumulator that can safely release the high pressure gas in case of a fire.

A second object of the present invention is to provide an accumulator incorporated with a safety valve that is capable of releasing the high pressure gas when required without reducing the sealing capability during normal use.

A third object of the present invention is to provide an accumulator incorporated with a safety valve that is simple and economical.

According to the present invention, such objects can be accomplished by providing an accumulator, comprising: a pressure vessel having a liquid introduction port at an end thereof; a bellows having a first end attached to the inner surface of the pressure vessel so as to separate the interior of the pressure vessel into a liquid chamber communicating with the liquid introduction port and a gas chamber filled with pressurized gas; a stay member attached to the inner surface of the pressure vessel inside the liquid chamber defining therein a small chamber communicating with the liquid introduction port, the stay member being provided with a communication port for communicating the interior of the small chamber with the remaining part of the liquid chamber and adapted to be closed by a part of the bellows to define a fully contracted state of the bellows; and a safety valve provided in the stay member for selectively communicating the exterior of the stay member with the interior of the stay member.

Thus, because the safety valve is not provided in the pressure vessel itself, and because the safety valve is provided in the stay member which is entirely received in the liquid chamber and is not subjected to any pressure difference during normal use, the safety valve of the present invention would not affect the sealing capability of the pressure vessel.

Also, the safety valve is normally immersed in liquid and liquid can be sealed more easily than gas. Furthermore, even when there is a small leakage in the safety valve, it would not cause any serious problem.

The bellows may consist of a substantially cylindrical bellows having a first axial end attached to the inner surface of the end of the pressure vessel and a second axial end closed by an end plate, the end plate being adapted to close the communication port in the fully contracted state of the bellows.

According to a preferred embodiment of the present invention, the stay member comprises a cup-shaped member having an open end attached to the periphery of the liquid introduction port inside the pressure vessel, a cylindrical side wall and a free end closed by an end plate having the communication port formed therein, and the bellows consists of a metallic bellows. In such a case, the safety valve may be conveniently placed in the side wall of the stay member.

The safety valve may consist of a common mechanical valve including a valve seat communicating the interior of the stay member with the exterior of the stay member and a spring-loaded valve element normally closing the valve seat. However, it may also consist of a weakened portion of the stay member so that the structure may be simplified and the manufacturing cost may be minimized. Typically, the weakened portion comprises a localized thin-walled portion of the stay member.

The weakened portion may also consist of an annular groove extending entirely around the side wall. In this case, the annular groove may be located on a plane perpendicular to the axial line of the stay member or on a plane at an angle with respect to an axial line of the stay member. If the annular groove is located on a plane at an angle with respect to an axial line of the stay member, when the inner pressure of the gas chamber rises excessively and the annular groove breaks, the opposing annular edges of the two parts of the stay member above and below the annular groove abut each other on this angled plane, and this causes a lateral movement of the upper part of the stay member. Therefore, the communication port is prevented from being closed, and the required relief action can be ensured without fail.

According to another preferred embodiment of the present invention, the safety valve comprises a hole formed in the stay member and a plug fitted into the hole and made of material having a relatively low melting point. This melting point is selected to be at least lower than that of the material of the pressure vessel so that the plug melts away and permits the gas chamber to be communicated with the liquid pressure circuit via this hole and liquid introduction port before the pressure vessel ruptures in case of a high temperature situation such as a fire.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
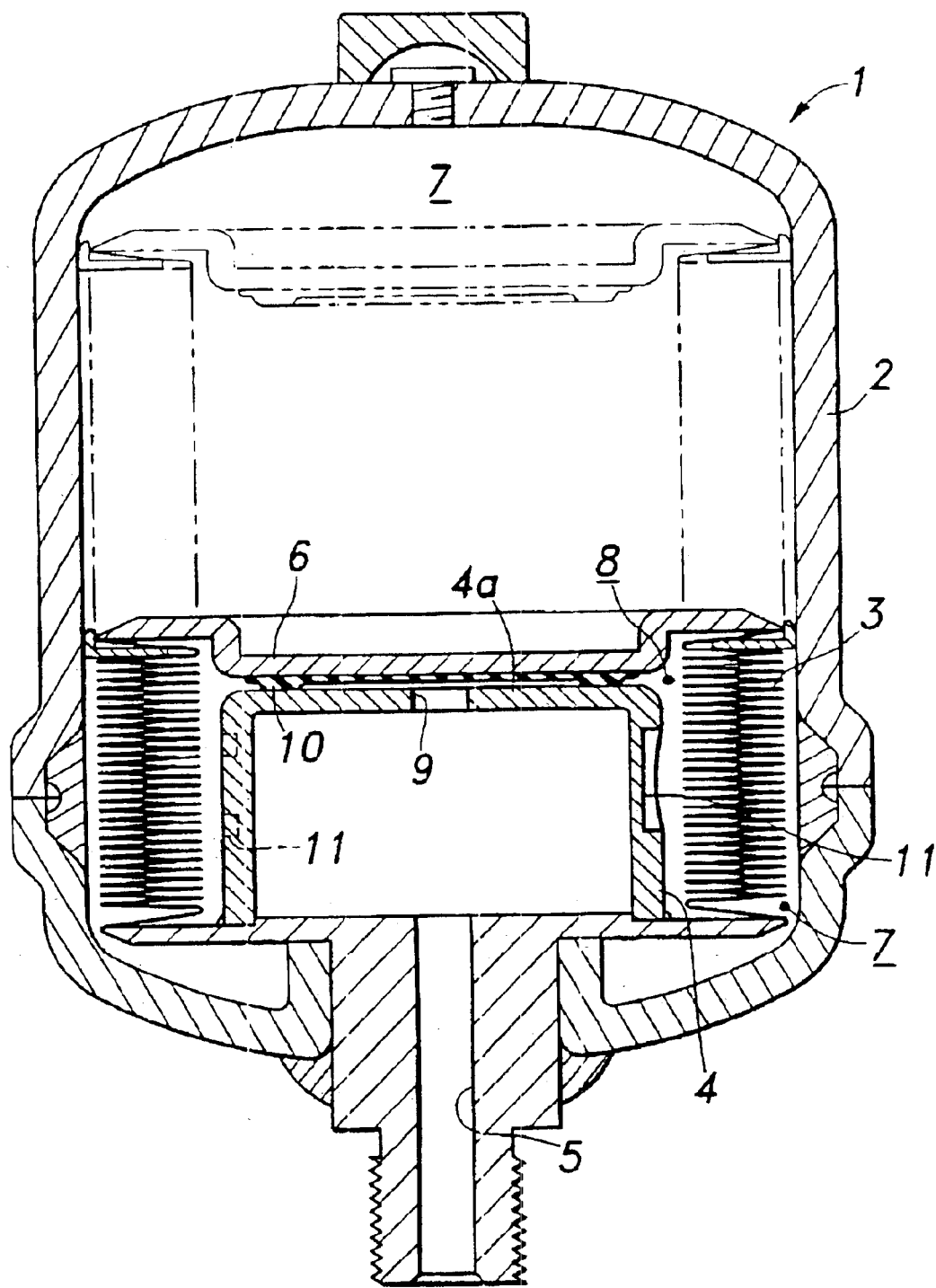
FIG. 1 is a vertical sectional view showing the general structure of an accumulator embodying the present invention.

FIG. 1 shows the essential structure of an accumulator embodying the present invention. This accumulator 1 comprises a pressure vessel 2, a bellows 3 that can freely extend and contract, and a substantially cup-shaped stay member 4. In this embodiment, all of these components including the bellows are made of stainless steel. However, other selections of the material are possible without departing from the spirit of the present invention. Some or all of the components may also be made of plastic material or other metallic material.

The pressure vessel 2 is formed by welding together a plurality of components, and is provided with a liquid introduction port 5 at an end thereof for connection with a liquid pressure circuit not shown in the drawing. The metallic bellows 3 has a substantially cylindrical shape or is sleeve-shaped, and is provided with a base end attached to the inner surface of the end of the pressure vessel 2 where the liquid introduction port 5 opens out and a free end closed by a circular end plate 6. Therefore, the metallic bellows 3 divides the interior of the pressure vessel 2 into a gas chamber 7 enclosing high pressure gas and a liquid chamber 8 receiving the pressurized liquid of the liquid pressure circuit via the liquid introduction port 5.

The stay member 4 consists of a cup-shaped member having an open end attached to the periphery of the liquid introduction port 5 inside said pressure vessel 2, a cylindrical side wall and an upper end plate 4a having a communication port 9 formed therein. The stay member 4 is disposed inside the metallic bellows 3 so that the end plate 6 of the metallic bellows 3 comes into contact with the end plate 4a of the stay member 4 to thereby limit the contracting movement of the metallic bellows 3 when the bellows 3 has fully contracted. The communication port 9 communicates the liquid chamber 8, in particular the part of the liquid chamber 8 defined between the stay member 4 and metallic bellows 3, with the liquid pressure circuit via the liquid introduction port 5 of the pressure vessel 2. The communication port 9 is adapted to be closed by a resiliently deformable valve element 10 which is made of elastomer and attached to the inner surface of the end plate 6 of the metallic bellows 3 by engaging the upper end wall 3a of the stay member 4.

In this accumulator 1, the metallic bellows 3 extends and contracts so as to achieve a balance between the liquid pressure transmitted to the liquid chamber 8 via the liquid introduction port 5 and the pressure of the gas sealed in the gas chamber 7. Therefore, pressure pulsation typically caused by a pump and transient pressure fluctuations can be absorbed by virtue of the inner volume of the gas chamber 7. When the metallic bellows 3 contracts with the drop in the liquid pressure, the valve element 10 provided on the end plate 6 abuts the periphery of the communication port 9 provided in the stay member 4, and closes the communication port 9. This achieves a seal which prevents the pressure of the liquid chamber 8 from falling below that of the gas chamber 7.

The gas chamber 7 of the accumulator 1 is entirely formed by welding and can therefore substantially eliminate the possibility of gas leakage during use. Therefore, the required performance can be maintained for an extended period of time. On the other hand, this high sealing performance may turn into a disadvantage when exposed to a high temperature, such as those encountered in a fire.

It should be noted that the pressure vessel 2 is designed with such a safety factor that the pressure vessel 2 can withstand the inner pressure safely and indefinitely during use and at least for a short period of time even when exposed to a high temperature. However, in case of a vehicle fire, because a high calorie fuel such as gasoline often burns over an extended period of time, the resulting heat could damage the capability of the pressure vessel 2 to withstand the pressure to such an extent that the pressure vessel 2 may become unable to withstand the sharp rise in the, internal pressure, and may even rupture in spite of the safety factor.

To avoid such an undesirable state to occur, it is necessary to release the high pressure gas in the gas chamber 7 before the pressure vessel 2 ruptures. Based on such a consideration, according to the present invention, the strength of the metallic bellows 3 to withstand pressure is set lower than that of the pressure vessel 2, and the side wall of the stay member 4 is provided with a safety valve for releasing the inner pressure of the liquid chamber 8 to the liquid introduction port 5.

In the example illustrated in FIG. 1, the safety valve consists of a weakened portion 11 formed by a circular recess having a diameter of 10 mm and milled in the side wall of the stay member 4 so as to leave a wall thickness of approximately 1 mm. According to this arrangement, when the inner pressure of the gas chamber 7 rises beyond a prescribed level and the inner pressure of the liquid chamber 8 rises as a result, this pressure causes the weakened portion 11 of the side wall of the stay member 4 to break, and the metallic bellows 3 to thereby rupture. This breaks the seal between the gas chamber 7 and liquid chamber 8, and the high pressure gas is safely released to the oil pressure circuit via the broken weakened portion 11 and the liquid introduction port 5, thereby avoiding the rupture of the pressure vessel 2.

If the weakened portion 11 is too small, the metallic bellows 4 may not rupture and the desired relief action cannot be obtained. Therefore, the diameter of the weakened portion 11 should be appropriately selected according to the pressure withstanding strength of the metallic bellows 3 and the sealed pressure of the high pressure gas.

The weakened portion may also consist of an annular groove having a diameter of 10 mm, for instance, formed in a side wall of the stay member 4 as indicated by imaginary lines denoted by numeral 11' on the left side of FIG. 1. This provides a similar action as the weakened portion 11 illustrated in FIG. 1.

Figure 2:
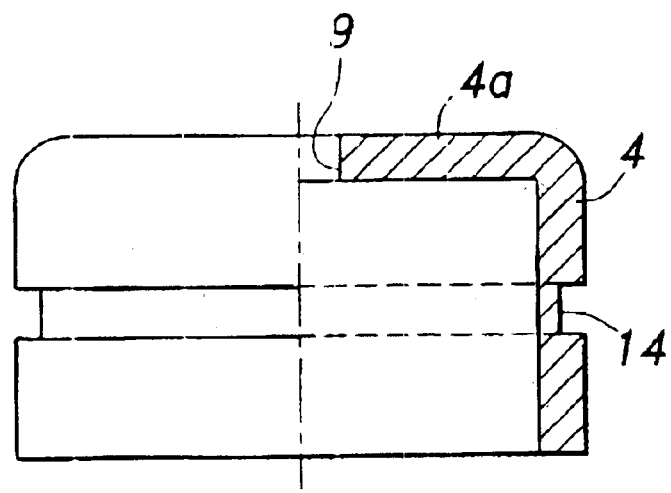
FIG. 2 is a fragmentary sectional view showing a second embodiment of the present invention.

Referring to FIG. 2, the weakened portion may also be provided by forming a thin-walled portion 14 consisting of an annular groove extending around the entire circumference of the side wall of the stay member 4 so that an undue rise in the liquid pressure inside the metallic bellows 3 would break this thin-walled portion 14.

Figure 3:
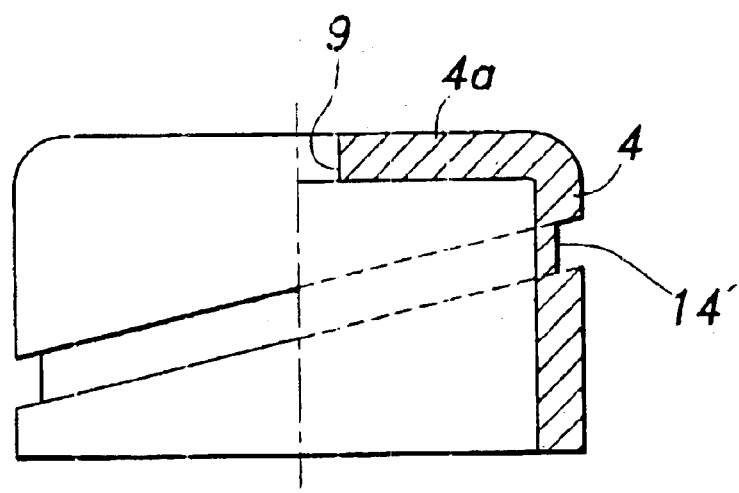
FIG. 3 is a fragmentary sectional view showing a third embodiment of the present invention.

According to the arrangement illustrated in FIG. 2, the relief action may not be ensured if the stay member 4 has axially collapsed, and a metallic contact is established between the two opposing annular edges of the two parts of the stay member 4 above and beneath the thin-walled portions 14. To avoid this to occur, the annular groove may be tilted with respect to the axial line by a suitable angle as denoted by numeral 14' in FIG. 3 so that the end plate 4a of the stay member 4 will be displaced laterally relative to the valve element 10 formed in the end plate 6 of the metallic bellows 3 to thereby keep the communication port 9 open when the thin-walled portion 14' has been destroyed.

Figure 4:
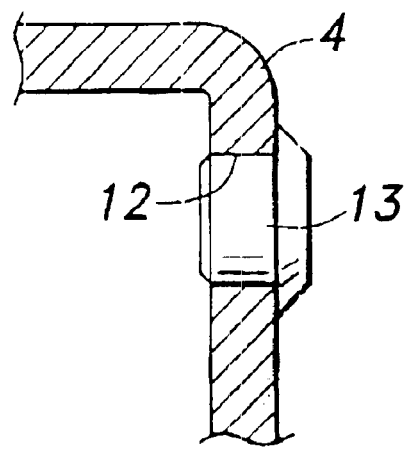
FIG. 4 is a fragmentary sectional view showing a fourth embodiment of the present invention.

There are other possible ways to implement the safety valve that is to be provided in the stay member 4, beside from the provision of a locally weakened portion by machining. For instance, as shown in FIG. 4, a plug 13 made of metal or plastic material having a relatively low melting point may be fitted into a hole 12 formed in the side wall of the stay member 4 so that the plug 13 may melt away at a high temperature and the hole 12 thereby exposed may allow the high pressure gas to escape from the liquid introduction port 5.

Figure 5:
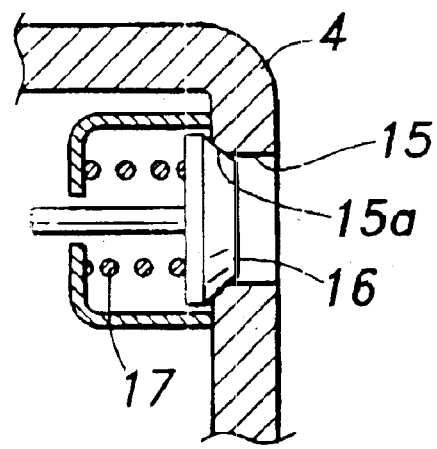
FIG. 5 is a fragmentary sectional view showing a fifth embodiment of the present invention.

Alternatively, as shown in FIG. 5, the safety valve may consist of a mechanical safety valve which comprises a valve seat 15a formed in a hole 15 passed through the side wall of the stay member 4 and a valve element 16 which normally closes the valve seat 15a under the resilient spring force of a spring 17. The spring force is selected in such a manner that any undue high pressure in the gas chamber causes the valve element 16 to open the hole 15. Because the bellows 3 is unable to withstand any such pressure, this causes the bellows 3 to break and the pressure of the high pressure gas to escape to the liquid pressure circuit via the hole 15 and the liquid introduction port 5.

Thus, the present invention provides a safety valve that opens at the time of a high pressure or high temperature situation without affecting the sealing capability of the pressure vessel during normal use in any way. Therefore, even at the time of a fire, the resulting high pressure can be released before the pressure vessel ruptures without impairing the reliability of the accumulator during normal use in any way.

Although the present invention has been described in terms of preferred embodiments thereof, it is obvious to a person skilled in the art that various alterations and modifications are possible without departing from the scope of the present invention which is set forth in the appended claims.

What is claimed is:

1. An accumulator, comprising:
   a pressure vessel having a liquid introduction port at an end thereof;
   a bellows having a first end attached to an inner surface of said pressure vessel so as to separate the interior of said pressure vessel into a liquid chamber communicating with said liquid introduction port and a gas chamber filled with pressurized gas;
   a stay member attached to said inner surface of said pressure vessel inside said liquid chamber defining therein a small chamber communicating with said liquid introduction port, said stay member being provided with a communication port for communicating the interior of said small chamber with the remaining part of said liquid chamber and adapted to be closed by a part of said bellows to define a fully contracted state of said bellows; and
   a safety valve provided in said stay member for selectively communicating said liquid chamber with said inner small chamber of said stay member, wherein the safety valve opens automatically if the pressure and/or temperature exceeds a prescribed level.

2. An accumulator according to claim 1, wherein said bellows consists of a substantially cylindrical bellows having a first axial end attached to said inner surface of said end of said pressure vessel and a second axial end closed by an end plate, said end plate being adapted to close said communication port in said fully contracted state of said bellows.

3. An accumulator according to claim 2, wherein said stay member comprises a cup-shaped member having an open end attached to the periphery of the liquid introduction port inside said pressure vessel, a cylindrical side wall and a closed end closed by an end plate having said communication port formed therein.

4. An accumulator according to claim 3, wherein said safety valve is provided in said side wall of said stay member.

5. An accumulator according to claim 4, wherein said safety valve is formed by a weakened portion of said stay member.

6. An accumulator according to claim 5, wherein said weakened portion comprises a localized thin-walled portion of said stay member.

7. An accumulator according to claim 6, wherein said weakened portion comprises an annular groove extending entirely around said side wall.

8. An accumulator according to claim 7, wherein said annular groove extends at an angle with respect to an axial line of said stay member.

9. An accumulator according to claim 1, wherein said safety valve is formed by a weakened portion of said stay member.

10. An accumulator according to claim 9, wherein said weakened portion comprises a localized thin-walled portion of said stay member.

11. An accumulator according to claim 1, wherein said safety valve comprises a hole formed in said stay member and a plug fitted into said hole and made of material having a relatively low melting point.

12. An accumulator according to claim 1, wherein said safety valve comprises a valve seat communicating the interior of said stay member with the exterior of the stay member and a spring-loaded valve element normally closing said valve seat.

13. An accumulator according to claim 1, wherein said bellows comprises a metallic bellows.

* * * * *